Patented May 27, 1952

2,598,209

UNITED STATES PATENT OFFICE 2,598,209

METHOD OF MAKING AGGLOMERATES

Thomas W. Bartram, St. Albans, W. Va., assignor to Monsanto Chemical Company, St. Louis, Mo., a corporation of Delaware No Drawing. Application September 8, 1950, Serial No. 183,898

10 Claims. (Cl. 260—787)

This invention relates to improved dust free compositions and methods of making same. More particularly it relates to a method of making readily dispersible dust free compositions for rubber compounding.

Copending application of Monte, Throdahl, Serial No. 106,328 filed July 22, 1949, and now abandoned, describes the preparation of dustless bead-like agglomerates from rubber accelerators. The general method of preparation involves heating a slurry of the accelerator to be agglomerated in the presence of 33–55 parts by weight of a suitable binding agent per 100 parts by weight of accelerator with subsequent cooling and separation of the bead-like particles. Continuation-in-part application of Monte C. Throdahl, Serial No. 183,899 and application of Kenneth E. Creed, Jr., Serial No. 183,897 of even date herewith disclose that agglomeration may be effected by continued heating and stirring, the cooling step becoming incidental. By this means particles containing 5–55 parts binder per 100 of accelerator could be produced and other rubber compounding agents agglomerated. The binding agents employed are waxy materials as for example, paraffin but preferably a waxy material having a polar group like stearic acid. This invention relates to improvements in this process employing a waxy material having a polar group as one of the constituents.

The process proved to be somewhat erratic with certain accelerators and antioxidants. For example, the time necessary to produce agglomerates varied considerably or conditions of the process such as rate of stirring, temperature and other variables had to be controlled precisely for reproducible results.

In accordance with this invention it has been discovered that more reproducible results are obtained if in addition to a polar binding agent there is added to the slurry a small amount of an essentially neutral water insoluble organic material. Best results have been obtained with colloids like glue. In the presence of glue the bead-like agglomerates are more stable as well as less erratic in formation. Occasionally a run which apparently starts to aggregate satisfactorily disintegrates on continued stirring and heating whereas in the presence of glue the agglomerating reaction continues normally. It is believed that glue has a seeding effect in providing a nucleus on which particles can grow although the invention is not limited to any theory of the mode in which the agents function to produce the results observed. The effect appears to be physical since a wide variety of materials of diverse chemical nature are satisfactory. The essential characteristics are that the material be water insoluble but capable of producing a uniform fine dispersion.

Tetramethyl thiuram disulfide is a typical example of a rubber accelerator advantageously agglomerated in the presence of glue. This accelerator may be used directly in the form of a slurry obtained by the oxidation of sodium dimethyl dithiocarbamate, the usual method of manufacture. The invention will be illustrated employing the method of Cooper, U. S. 2,375,083, wherein oxidation is effected by chlorine but it is by no means limited thereto. Seventy parts by weight of tetramethyl thiuram disulfide contained in an aqueous slurry of approximately 20% concentration obtained by the oxidation of sodium dimethyl dithiocarbamate with chlorine was charged into a suitable container. One part of hide glue was dissolved in the dispersion or preferably added as a 2% solution and the pH adjusted to 3.5–4.5 by means of dilute hydrochloric acid. Thirty parts by weight of stearic acid were added and the mixture heated at a temperature in the range of 60–65° C. while subjecting to efficient agitation until bead-like agglomerates of the desired size were produced. The reaction was then terminated by quickly cooling with an excess of cold water, the particles filtered off, washed and dried. Usually the particles are larger than 40 mesh by the time the temperature reaches about 62° C.

Dispersions of substantially 70 parts by weight of tetramethyl thiuram disulfide in 280 parts by weight of water were prepared and the pH adjusted to 5–6. Substantially 25 parts by weight stearic acid was added and substantially 5 parts by weight of one of the additives listed below and the mixture stirred and heated at about 65° C. until particulate bead-like agglomerates larger than 40 mesh were produced. The results are tabulated below:

| Additive | Time of Heating Minutes | Yield-Parts by Weight Retained on 40 Mesh Screen |
|---|---|---|
| Glyceryl Phthalate | 20 | 95 |
| Glyceryl Phthalate | 120 | 101.2 |
| Pine Oil | 10 | 90.9 |
| Chlorobutadiene Rubber as Neoprene Latex, Type 571 | 15 | 73.7 |
| Pine Tar | 30 | 78.5 |

In another series of preparations illustrative of the invention the base change was similar to that described above namely, 70 parts by weight of tetramethyl thiuram, 25 parts by weight of stearic acid and 5 parts by weight of various additives dispersed in 280 parts by weight of water but in addition 10 parts by weight of mono sodium phosphate was added as buffer. The dispersions were heated at about 65° C. to form bead-like agglomerates the results being tabulated below:

| Additive | Time of Heating Minutes | Yield-Parts by Weight Retained on 40 Mesh Screen |
|---|---|---|
| Ester Gum | 90 | 93.5 |
| Retene Oil | 30 | 92.1 |
| Pine Tar | 30 | 93.5 |
| Natural Rubber as 60% Latex | 60 | 95.0 |
| Styrene | 5 | 94.9 |
| Cellulose Flour | 30 | 96.9 |
| Terpene Alcohol-Condensation of Pinene and Formaldehyde known as NOPOL | 60 | 101.2 |

As a further example of a specific embodiment of the invention 70 parts by weight of finely powdered 1,3-bis(2-benzothiazolyl mercaptomethyl)urea was suspended in 250 parts by weight of water together with 30 parts by weight of rubber grade stearic acid. The slurry was adjusted to a pH of 3.7 and while agitating was heated to 90° C. Agglomerates soon formed but they thereafter disintegrated on further stirring. One part by weight of glue was added and the heating and stirring continued. In a short time stable particulate bead-like agglomerates formed. After heating 15 minutes at 70° C. the reaction was quenched by adding an excess of cold water and the bead-like particles separated from the slurry by filtering through a 40 mesh screen, washed and dried. The yield was substantially quantitative.

In general the proportion of stearic acid may vary from 5-55 parts by weight on the rubber compounding agent and improved results have been obtained with additives in the range of 1-10 parts by weight per hundred of the rubber compounding agent the optimum proportions being about 1.4 to 7.1 parts by weight. Bead-like agglomerates may be formed with stearic acid by heating at any temperature above that required to liquify it in the slurry up to the temperature which will liquify or decompose the rubber compounding agent. However, prolonged heating of thiuram sulfides at high temperatures in the presence of organic acids is undesirable since some decomposition takes place and better results are obtained by heating at temperatures in the vicinity of 60-65° C.

Stearic acid may be replaced by other fatty acids or employed in admixture with other organic acids as for example naphthenic acid.

Among the rubber compounding materials which may be employed in the practice of this invention in addition to those already mentioned are 2,2'-dithiobis benzothiazole, mercaptobenzothiazole, tetramethyl thiuram monosulfide, zinc dimethyl dithiocarbamate, sulfur and 1,2-dihydro-2,2,4-trimethyl quinoline. The process is particularly adaptable to the formation of bead-like compositions of water insoluble compounding agents having melting points above 100° C. Wetting agents and soap are to be avoided and the slurries should be neutral or acid in order to avoid the formation of soap on heating in the presence of stearic acid.

Although the present invention has been described and illustrated in connection with certain embodiments it is to be understood that the invention is not limited thereto and that modifications and variations thereof may be made without departing from the spirit or scope of the invention.

What is claimed is:

1. The process of making an improved dustless composition for rubber compounding which comprises subjecting to agitation an acidic aqueous dispersion of a mixture of an organic water insoluble accelerator melting above 100° C., a waxy binder containing a polar group in about 5-55 parts by weight per 100 parts of accelerator, and a water insoluble essentially neutral organic binder in about 1-10 parts by weight per 100 parts of accelerator and heating while continuing the stirring until bead-like agglomerates larger than 40 mesh are formed.

2. The process of making an improved dustless composition for rubber compounding which comprises subjecting to agitation an acidic aqueous dispersion of a mixture of an organic water insoluble accelerator melting above 100° C., a higher fatty acid in about 5-55 parts by weight per 100 parts of accelerator, and a neutral organic colloid in about 1-10 parts by weight per 100 parts of accelerator and heating while continuing the stirring until bead-like agglomerates larger than 40 mesh are formed.

3. The process of making an improved dustless composition for rubber compounding which comprises subjecting to agitation an acidic aqueous dispersion of a mixture of a thiuram sulfide accelerator melting above 100° C., stearic acid in about 5-55 parts by weight per 100 parts of accelerator, and a neutral organic colloid in about 1-10 parts by weight per 100 parts of accelerator and heating while continuing the stirring until bead-like agglomerates larger than 40 mesh are formed.

4. The process of making a dustless free-flowing accelerator composition further characterized by very rapid dispersion into a rubber on milling which comprises subjecting to agitation an acidic aqueous dispersion of a water insoluble accelerator of vulcanization in the presence of approximately 33-55 parts by weight per 100 of the accelerator of a waxy binder containing a polar group and in addition thereto 1-10 parts by weight per 100 of the accelerator of a water insoluble essentially neutral organic binder in uniform finely divided dispersion, and heating while continuing the stirring until bead-like agglomerates larger than 40 mesh are formed.

5. The process of making a dustless free-flowing accelerator composition further characterized by very rapid dispersion into a rubber on milling which comprises subjecting to agitation an acidic aqueous dispersion of a thiuram sulfide accelerator in the presence of approximately 33-55 parts by weight per 100 of the accelerator of a higher fatty acid and in addition thereto 1-10 parts by weight per 100 of the accelerator of a neutral organic colloid and heating while continuing the stirring until bead-like agglomerates larger than 40 mesh are formed.

6. The process of making a dustless free-flowing accelerator composition further characterized by very rapid dispersion into a rubber on milling which comprises subjecting to agitation an acidic aqueous dispersion of tetramethyl thiuram disulfide in the presence of approximately 33-55 parts by weight per 100 of the tetramethyl thiuram disulfide of stearic acid and in addition thereto 1-10 parts by weight per 100 of the tetramethyl thiuram disulfide of a water insoluble essentially neutral organic binder in uniform finely divided dispersion, and heating at 60–70° C. while continuing the stirring until bead-like agglomerates larger than 40 mesh are formed.

7. The process of making a dustless free-flowing accelerator composition further characterized by very rapid dispersion into a rubber on milling which comprises subjecting to agitation an acidic aqueous dispersion of tetramethyl thiuram disulfide in the presence of approximately 33–55 parts by weight per 100 of the tetramethyl thiuram disulfide of stearic acid and in addition thereto 1–10 parts by weight per 100 of the tetramethyl thiuram disulfide of glue and heating at 60–65° C. while continuing the stirring until bead-like agglomerates larger than 40 mesh are formed.

8. The process of making a dustless free-flowing accelerator composition further characterized by very rapid dispersion into a rubber which comprises subjecting to agitation an acidic aqueous dispersion of about 70 parts by weight of tetramethyl thiuram disulfide and about 30 parts by weight of binder consisting in stearic acid and glue, the glue being about 1–10 parts by weight per 100 of the tetramethyl thiuram disulfide and heating at 60–65° C. until bead-like agglomerates larger than 40 mesh are formed.

9. The process of making a dustless free-flowing accelerator composition further characterized by very rapid dispersion into a rubber on milling which comprises subjecting to agitation an acidic aqueous dispersion of 1,3-bis(2-benzothiazolylmercaptomethyl)urea in the presence of approximately 33–55 parts by weight per 100 of the 1,3-bis(2-benzothiazolylmercaptomethyl)-urea of a higher fatty acid and in addition thereto 1–10 parts by weight per 100 of the 1,3-bis(2-benzothiazolylmercaptomethyl)urea of an essentially neutral organic colloid and heating while continuing the stirring until bead-like agglomerates larger than 40 mesh are formed.

10. The process of making a dustless free-flowing accelerator composition further characterized by very rapid dispersion into a rubber on milling which comprises subjecting to agitation an acidic aqueous dispersion of about 70 parts by weight of 1,3-bis(2-benzothiazolylmercaptomethyl)urea in the presence of approximately 30 parts by weight stearic acid and in addition thereto 1–10 parts by weight per 100 of the 1,3-bis(2-benzothiazolylmercaptomethyl)urea of glue and heating while continuing the stirring until bead-like agglomerates larger than 40 mesh are formed.

THOMAS W. BARTRAM.

REFERENCES CITED

The following references are of record in the file of this patent:

UNITED STATES PATENTS

| Number | Name | Date |
|---|---|---|
| 2,326,984 | Tomlin | Aug. 17, 1943 |
| 2,343,835 | Smith | Mar. 7, 1944 |